United States Patent [19]

Takemasa et al.

[11] Patent Number: 5,792,968

[45] Date of Patent: Aug. 11, 1998

[54] METHOD FOR DETECTION OF A SPINNING VEHICLES WHEEL

[75] Inventors: Noriyuki Takemasa; Keiji Toyoda; Wataru Ozawa; Susumu Yamada; Hiroshi Oshiro, all of Hamakita, Japan

[73] Assignee: Nisshinbo Industries Inc., Tokyo, Japan

[21] Appl. No.: 772,006

[22] Filed: Dec. 19, 1996

[30] Foreign Application Priority Data

Dec. 28, 1995 [JP] Japan .................. 7-353026

[51] Int. Cl.[6] ............................................. G01P 15/00
[52] U.S. Cl. .......................... 73/488; 701/74; 701/75; 701/76; 701/92; 303/170; 303/173; 303/DIG. 7; 188/181 C; 364/426.038
[58] Field of Search ................................ 73/488; 701/70, 701/71, 74, 75, 76, 82, 92; 303/170, 173, DIG. 7; 180/197; 188/181 C; 364/426.015, 426.016, 426.038, 426.045

[56] References Cited

U.S. PATENT DOCUMENTS

| | | |
|---|---|---|
| 4,545,623 | 10/1985 | Sato et al. ............... 303/191 |
| 4,566,737 | 1/1986 | Masaki et al. ............ 303/173 |
| 4,980,831 | 12/1990 | Katayama et al. .......... 701/74 |
| 4,989,685 | 2/1991 | Matsuda ................... 180/197 |
| 5,015,042 | 5/1991 | Yoshino .................. 303/170 |
| 5,200,897 | 4/1993 | Makino et al. ............ 701/76 |
| 5,292,184 | 3/1994 | Takata ................... 303/147 |
| 5,498,072 | 3/1996 | Shimizu .................. 303/191 |
| 5,699,251 | 12/1997 | Mori et al. ........... 364/426.045 |

*Primary Examiner*—Christine K. Oda
*Assistant Examiner*—Richard A. Moller
*Attorney, Agent, or Firm*—Nikaido, Marmelstein, Murray & Oram LLP

[57] ABSTRACT

A method of an accurate detection of a spinning vehicle wheel. Observed wheel speeds are derived by measuring the speed of each wheel and the slowest speed is set as the slowest observed wheel speed. A maximum probable wheel speed is derived by multiplying the slowest observed wheel speed by the ratio of the maximum wheel speed to the slowest wheel speed for a given minimum turning radius. The maximum probable wheel speed is compared with an observed wheel speed and if the observed wheel speed is greater, the wheel is deemed to be spinning.

7 Claims, 2 Drawing Sheets

METHOD FOR DETECTION OF A SPINNING VEHICLES WHEEL

BACKGROUND OF THE INVENTION

This invention relates to a method for the detection of a spinning vehicle wheel.

Many vehicles are equipped with a mini tire as the spare tire. Conventionally, in an antilock brake control operation for such vehicles, the speed of each wheel is measured, after which the slowest wheel speed is determined. If the speed of any other wheel exceeds the slowest speed by a threshold value, for example, by 25%, then the wheel is deemed to be spinning and the correction for a mini tire is suspended. However, if the vehicle is turning and all four tires are in fact gripping the road, there could be cases where the maximum wheel speed would exceed the slowest wheel speed by 25% or more.

That is, if a mini tire were mounted and the vehicle was turning, then even if all tires were gripping the road surface, the speed of the wheel with the mounted mini tire would be at least 25% faster than the slowest wheel speed, wherein the wheel would be deemed to be spinning, and correction for the mini tire would be suspended. This would result in antilock brake control operation with an inadequate amount of correction, thus extending the stopping distance.

OBJECT AND SUMMARY OF THE INVENTION

It is an object of this invention to accurately detect whether a vehicle wheel is spinning.

This invention is a method for detecting a spinning vehicle wheel, wherein observed wheel speeds are derived by measuring the speed of each wheel and the slowest speed is set as the slowest observed wheel speed, a maximum probable wheel speed is derived by multiplying the slowest observed wheel speed by a predetermined ratio of the maximum wheel speed to the slowest wheel speed for a given minimum turning radius, then the maximum probable wheel speed is compared with an observed wheel speed and if the observed wheel speed is greater, the wheel is deemed to be spinning.

In this invention, a minimum turning radius is derived from the slowest observed wheel speed, and a maximum probable wheel speed is derived by multiplying the slowest observed wheel speed by the ratio of the maximum wheel speed to the slowest wheel speed at that minimum turning radius.

Moreover, in this invention, the ratio of the maximum wheel speed to the slowest wheel speed at the minimum turning radius is derived from the relationship between the wheel base and tread of the vehicle and the wheel speeds.

Further, in this invention, the ratio is derived assuming that the tire mounted on the wheel with the maximum wheel speed is the mini tire used as a spare tire.

As a result, this invention enables the following advantages. The maximum probable wheel speed for a given minimum turning radius is set as the decision criterion as to whether a wheel is spinning, even if the wheel speed is 125% or more of the slowest wheel speed. Spinning can be detected more accurately, which in turn means that a mounted mini tire can be judged more accurately.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF PREFERRED EMBODIMENT

This invention is explained below using the attached diagrams.

1. Overview of spinning detection processes

Figure 1:
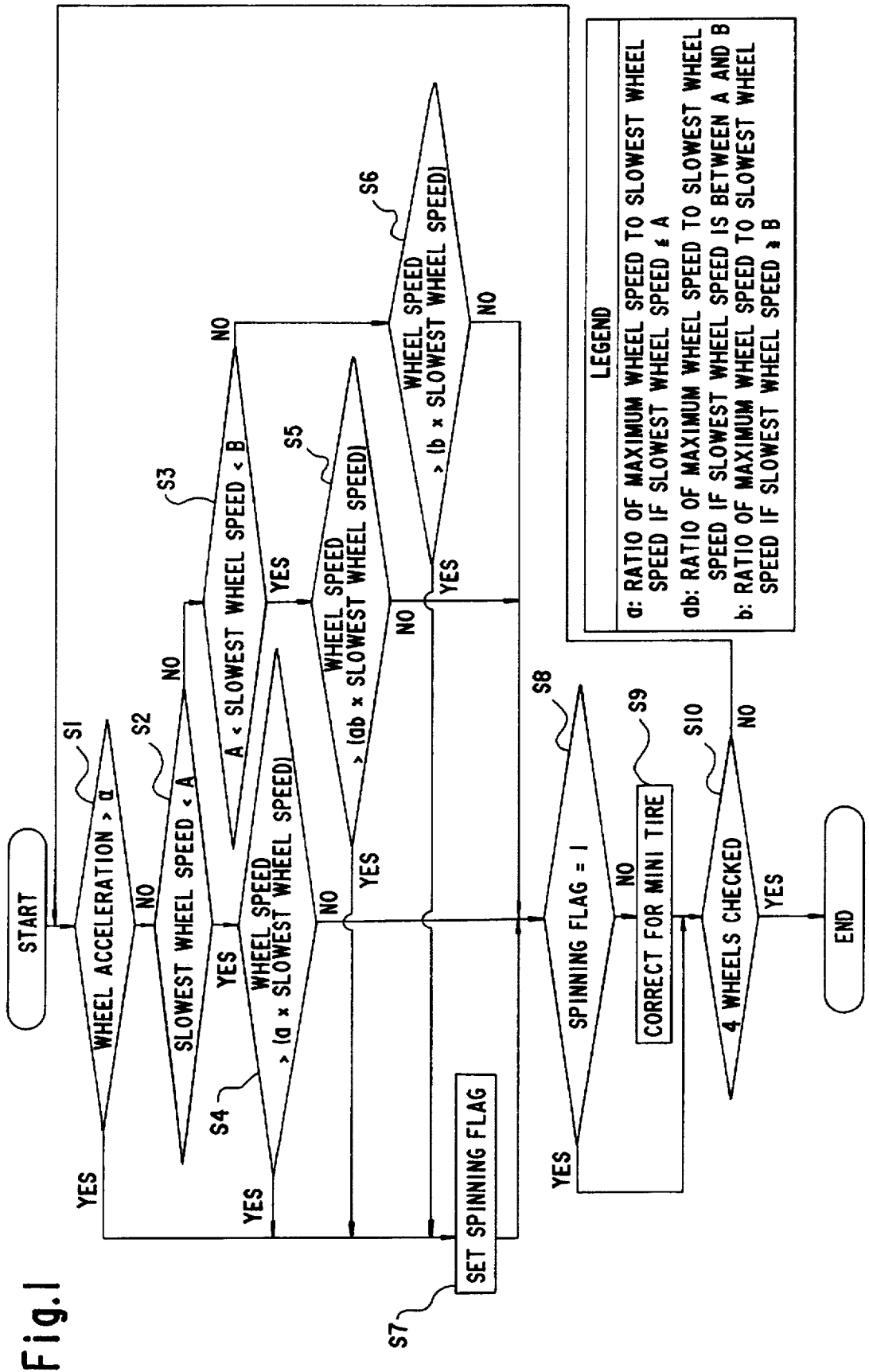
FIG. 1 is a decision flow chart of the process steps used in deeming whether a wheel is spinning.

FIG. 1 illustrates the processes used in detecting whether any wheel is spinning when a vehicle starts to move, or in some other motion. First, the acceleration of each wheel is compared to the maximum acceleration of the vehicle body that is feasible for the vehicle. If the wheel acceleration exceeds the maximum body acceleration, then the wheel is deemed to be spinning. Next, the minimum turning radius is derived for a vehicle turning at a speed equivalent to the slowest wheel speed of the four wheels. Assuming that the vehicle would have turned at the turning radius with all four tires gripping the road surface, the ratio of the maximum wheel speed to the slowest wheel speed is computed from the formulas relating the wheel base (distance between the front and rear axles of the vehicle) p and tread (distance between the points of contact with the ground of the two rear wheels) q of the vehicle and the wheel speed. Then the maximum probable wheel speed is derived by multiplying the slowest wheel speed by the ratio; and if a particular wheel speed exceeds the maximum probable wheel speed, then the wheel is deemed to be spinning.

2. Decisions made with vehicle acceleration value

A threshold vehicle acceleration a is predetermined from the weight, engine performance, and other attributes of the vehicle. The vehicle acceleration $\alpha$ is set as the maximum vehicle acceleration which, for example, could not be achieved under normal driving. In Step 1 of FIG. 1, the acceleration of each wheel computed from the wheel speed is compared with this vehicle acceleration $\alpha$. The wheel acceleration is greater than the vehicle acceleration $\alpha$, then the wheel is deemed to be spinning.

3. Computation of minimum turning radius

When a vehicle is turning, if its lateral acceleration (horizontal vector component of acceleration in direction of motion) exceeds a threshold value, for example, 0.8 G, then the vehicle cannot maintain its turning radius, hence a minimum turning radius relative to the vehicle speed can be derived as a function of the attributes of the vehicle. Examples of the minimum turning radius corresponding to various vehicle speeds are shown in Table 1. In determining whether a wheel is spinning when the vehicle starts forward or is in some other motion, the slowest wheel speed is used as the vehicle speed, and the minimum turning radius corresponding to the slowest wheel speed is derived from Table 1. The minimum turning radius is determined for a range of vehicle speeds; for example, as shown in Steps S2 and S3 of FIG. 1, observed vehicle speeds are classified into three stages, $\leq A$, A to B (where $A<B$), and $\geq B$, and the minimum turning radius is derived for each stage.

TABLE I

| Vehicle Speed (km/h) | Minimum Turning Radius (m) |
|---|---|
| 20 | 5.0 |
| 25 | 7.5 |
| 1 | 30 |
| 1 | 10.0 |

4. Formulas relating wheel base, tread, and wheel speed

Figure 2:
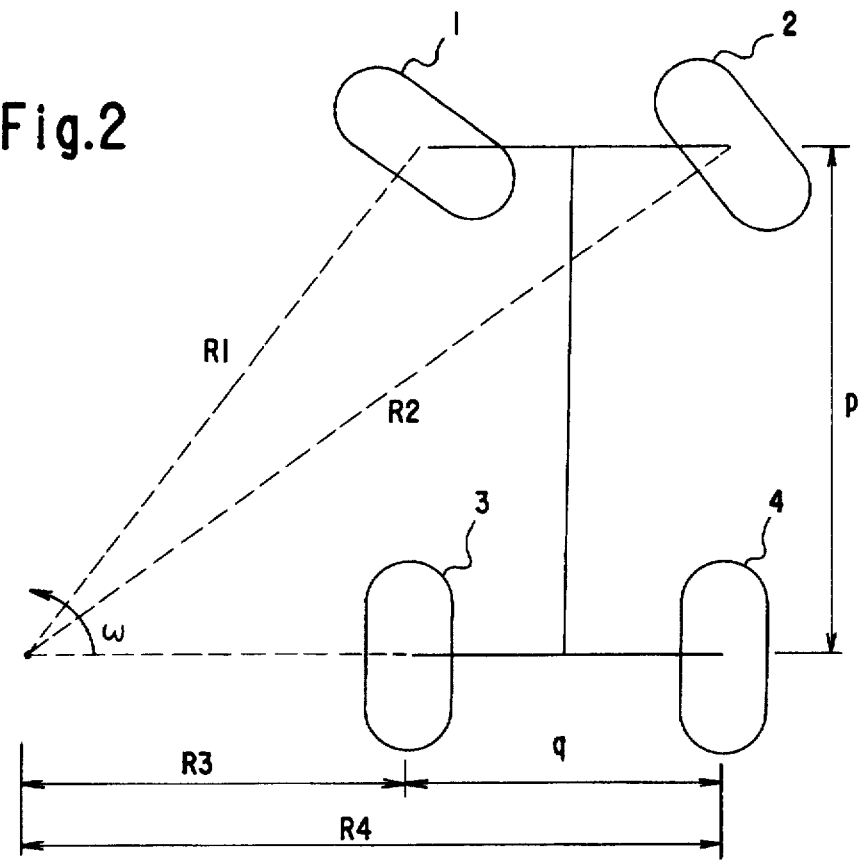
FIG. 2 illustrates the relationship between the wheel base and tread of a vehicle, and wheel speeds.

Once the minimum turning radius is determined, the ratio of the maximum wheel speed to the slowest wheel speed can be derived from formulas relating the wheel base p and tread q of the vehicle and wheel speeds. For example, if the vehicle is turning left as shown in FIG. 2, assuming that the vehicle is turning with all four tires gripping the road surface, then the following four formulas (Formula 1 through Formula 4) express the various relationships between the wheel base p, tread q, and wheel speed. In this case, the left rear wheel 3 is the wheel with the slowest speed, the right front wheel 2 is the wheel with the maximum wheel speed, R3 is the minimum turning radius, and the ratio of the maximum wheel speed to the minimum wheel speed can be derived from Formula 5.

Formula 1:

$$V1 = \omega R1 = (R3^2 + p^2)^{1/2} \times V3/R3$$

where

V1=Speed of left front wheel

V3=Speed of left rear wheel

R1=Turning radius of left front wheel

R3=Turning radius of left rear wheel

ω=Angular turning velocity of vehicle p=Wheel base.

Formula 2:

$$V2 = \omega R2 = ((R3+q)^2 + p^2)^{1/2} \times V3/R3$$

where

V2=Speed of right front wheel

R2=Turning radius of right front wheel q=Tread.

Formula 3:

$$V3 = \omega R3$$

Formula 4:

$$V4 = \omega R4 = (R3+q) \times V3/R3$$

where

V4=Speed of right rear wheel

R4=Turning radius of right rear wheel.

Formula 5:

$$V2/V3 = ((R3+q)^2 + p^2)^{1/2}/R3$$

5. Computation of ratio of maximum wheel speed to slowest wheel speed

If the slowest wheel speed is ≦A, then the ratio a of the maximum wheel speed to the slowest wheel speed is derived from Formula 5 using the minimum turning radius corresponding to the vehicle speed range. A similar ratio ab is derived in the same manner if the slowest wheel speed is between A and B., and a ratio b is derived if the slowest wheel speed is ≧B. The maximum probable wheel speed is derived by multiplying the observed slowest wheel speed by a, ab, or b. Note that here, ab is merely a symbol and is not equal to the product of a multiplied by b (not a×b).

Figure 3:
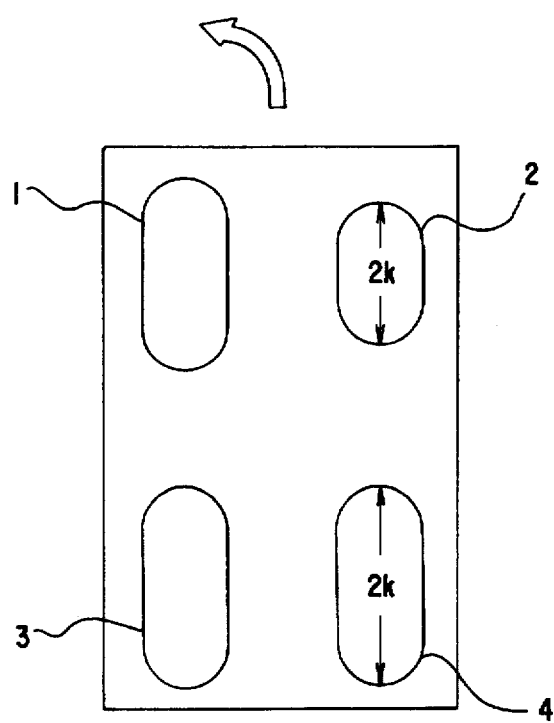
FIG. 3 illustrates an example of a mounted mini tire.

6. Computation of ratio of maximum wheel speed to slowest wheel speed if mini tire is mounted The maximum wheel speed increases if a mini tire has been mounted. For example, if the mini tire is mounted on the right front wheel as shown in FIG. 3, a corrected ratio of the maximum wheel speed to the slowest wheel speed is computed by multiplying the respective ratios a, ab, or b by the ratio K/k, where K is the diameter of a normal tire and k is the diameter of a mini tire. The maximum probable wheel speed if a mini tire is mounted is then derived by multiplying the slowest observed wheel speed by the corrected ratio.

7. Using the maximum probable wheel speed to detect spinning

As shown in Steps S4, S5, and S6 of FIG. 1, the maximum probable wheel speed is compared with an observed wheel speed, and if the observed wheel speed is greater, then the wheel is deemed to be spinning. This means that a tire is deemed to be gripping the road surface even if the ratio is >125% (that is, the wheel is deemed to be decelerating and not perceived to be spinning), and the correction process can continue.

8. Correction for mini tire

In Step S8, if a wheel is deemed not to be spinning, and if a mini tire is mounted, then in Step S9, a correction is made for the mini tire. In Step 10, these steps are repeated for each of the four wheels.

Next, a correction for a mini tire is explained using the front drive wheel as an example.

9. Detection of mounted mini tire (1)

In order that antilock control can be performed immediately upon movement of the vehicle, the speed of each of the four wheels is observed by the wheel speed sensor to derive an observed wheel speed. If all four tires mounted on the wheels are of the same diameter, that is normal tires, and all four tires are gripping the road, the relative observed speed of the wheels can be expressed by Formulas 6–8, regardless of the direction in which the vehicle is turning. Formulas 6–8 are derived from Formulas 1–4. An approximation formula can be substituted for Formula 8, of which Formula 9 is one example.

Formula 6:

$$V1 > V3$$

Formula 7:

$$V2 > V4$$

Formula 8:

$$V1^2 + V4^2 = V2^2 + V3^2$$

Formula 9:

$$V1 + V4 = V2 + V3$$

If the observed wheel speeds do not satisfy Formulas 6–9 and all four tires are gripping the road surface, then if V3>V1, the inference is that a mini tire has been mounted on the left rear wheel 3. Similarly, if V4 >V2, the inference is that a mini tire has been mounted on the right rear wheel 4.

Detection of mounted mini tire (2)

Formula 8 and Formula 9 are modified so that an individual wheel speed V1, V2, V3, or V4 constitutes the left side of the equation. For example, the speed V1 of the left front wheel is expressed by Formula 10 or Formula 11 as follows. The probable speed of each wheel can then be derived by substituting the observed wheel speed for the variables in the right-hand side of the equation.

Formula 10:

$$V1=(V2^2+V3^2-V4^2)^{1/2}$$

Formula 11:

$$V1=V2+V3-V4$$

The computed probable wheel speed is compared with the observed wheel speed, and if Formula 12 below is satisfied, then the inference is that a normal tire, and not a mini tire, is mounted. Conversely, if Formula 12 is not satisfied, then a mini tire is assumed to be mounted. However, if a mini tire is actually mounted, then the wheel diagonally opposite from the wheel on which the mini tire is mounted will not satisfy Formula 12. That is, if a mini tire is mounted on the right rear wheel 4, then the diagonally opposite left front wheel 1 will not satisfy Formula 12.

Formula 12:

$$\text{Probable wheel speed} \geq \text{Observed wheel speed}$$

If a mounted mini tire cannot be identified from among diagonally opposite wheels (for example, the left front wheel 1 and right rear wheel 4), then the other pair of diagonally opposite wheels (right front wheel 2 and left rear wheel 3 mounted with normal tires) are used to estimate each wheel speed. A probable wheel speed so obtained and the observed wheel speed are then compared. If the two speeds are equal, then the mounted tire is judged not to be a mini tire.

The wheel speed of diagonally opposite wheels (for example, left front wheel 1 and right rear wheel 4) can be expressed as a function of the wheel speed of the other diagonally opposite wheels (right front wheel 2 and left rear wheel 3), using Equations 1–4.

For example, the speed V1 of the left front wheel 1 can be expressed as a function of the speed V2 and V3 of the right front wheel 2 and left rear wheel 3 respectively, as shown in Formula 13. Also, Equations 1–4 are applicable for a left turn, but a similar relational formula can be expressed for a right turn.

$$V1^2 = V3^2 + \frac{[pqV3 - p\{(p^2+q^2)V2^2 - p^2 \times V3^2\}^{1/2}]^2}{(p^2+q^2)^2} \quad \text{Formula 13:}$$

Correction of diameter of mini tire

If a wheel is deemed not to be spinning, and the specific wheel on which a mini tire is mounted is determined, the observed wheel speed of the other three wheels with normal tires is substituted in Formulas 8–9 to derive the probable speed of the wheel on which the mini tire is mounted. Then the ratio of the probable wheel speed and the observed wheel speed (probable wheel speed/observed wheel speed) can be used to correct for the diameter of the mini tire.

Alternatively, if the diameter (k) of the mini tire is known, then the ratio of k to the diameter K of the normal tire (k/K) is multiplied by the observed wheel speed of the mini tire as observed by the wheel speed sensor to derive the corrected wheel speed. Antilock brake control then proceeds accurately using this corrected wheel speed.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What we claim is:

1. A method for detecting a spinning vehicle wheel comprising the steps of:

measuring the speed of each wheel, determining the slowest speed of the measured speeds, setting the slowest speed as the slowest observed wheel speed, deriving a maximum probable wheel speed by multiplying the slowest observed wheel speed by a ratio of a maximum wheel speed to the slowest wheel speed for a given minimum turning radius, comparing said maximum probable wheel speed with each measured wheel speed, and if the measured wheel speed is greater, deeming said wheel to be spinning.

2. A method for detecting a spinning vehicle wheel as claimed in claim 1, further comprising deriving said minimum turning radius from said slowest measured wheel speed, and deriving said maximum probable wheel speed by multiplying the slowest measured wheel speed by the ratio of the maximum wheel speed to the slowest wheel speed at that said minimum turning radius.

3. A method for detecting a spinning vehicle wheel as claimed in claim 2, further comprising deriving the ratio of the maximum wheel speed to the slowest wheel speed at said minimum turning radius from the relationship between a wheel base and a tread of the vehicle and the measured wheel speeds.

4. A method for detecting a spinning vehicle wheel as claimed in claim 2, wherein said ratio is derived assuming that a tire mounted on the wheel with said maximum wheel speed is a mini tire used as a spare tire.

5. A method for detecting a spinning vehicle wheel as claimed in claim 1, further comprising deriving the ratio of the maximum wheel speed to the slowest wheel speed at said minimum turning radius from the relationship between a wheel base and a tread of the vehicle and the measured wheel speeds.

6. A method for detecting a spinning vehicle wheel as claimed in claim 5, wherein said ratio is derived assuming that a tire mounted on the wheel with said maximum wheel speed is a mini tire used as a spare tire.

7. A method for detecting a spinning vehicle wheel as claimed in claim 1, wherein said ratio is derived assuming that a tire mounted on the wheel with said maximum wheel speed is a mini tire used as a spare tire.

* * * * *